(12) United States Patent
Werner et al.

(10) Patent No.: US 12,612,029 B2
(45) Date of Patent: Apr. 28, 2026

(54) METHOD FOR OPERATING A VEHICLE OPERATING DEVICE, AND VEHICLE OPERATING DEVICE

(71) Applicant: Robert Bosch GmbH, Stuttgart (DE)

(72) Inventors: Thomas Werner, Aalen (DE); Nicolas Boos, Mutlangen (DE); Stefan Kanngiesser, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 18/567,552

(22) PCT Filed: Jun. 3, 2022

(86) PCT No.: PCT/EP2022/065171
§ 371 (c)(1),
(2) Date: Dec. 6, 2023

(87) PCT Pub. No.: WO2022/258514
PCT Pub. Date: Dec. 15, 2022

(65) Prior Publication Data
US 2024/0278766 A1 Aug. 22, 2024

(30) Foreign Application Priority Data
Jun. 11, 2021 (DE) .................... 10 2021 205 924.4

(51) Int. Cl.
*B60W 10/20* (2006.01)
*B60K 26/02* (2006.01)

(52) U.S. Cl.
CPC ....... *B60W 10/20* (2013.01); *B60K 2026/029* (2013.01)

(58) Field of Classification Search
CPC .... B60W 10/20; B60W 10/04; B60W 50/087; B60W 50/16; B60W 2040/0863;
(Continued)

(56) References Cited

U.S. PATENT DOCUMENTS

| | | | |
|---|---|---|---|
| 2006/0137931 A1 | 6/2006 | Berg et al. | |
| 2015/0006013 A1* | 1/2015 | Wimmer ................ | B60K 35/10 701/23 |
| 2021/0331637 A1* | 10/2021 | Wildgrube ............. | B28C 5/422 |

FOREIGN PATENT DOCUMENTS

| | | |
|---|---|---|
| DE | 10 2009 015 800 A1 | 10/2010 |
| DE | 10 2011 051 488 A1 | 1/2013 |

(Continued)

OTHER PUBLICATIONS

International Search Report corresponding to PCT Application No. PCT/EP2022/065171, mailed Sep. 23, 2022 (German and English language document) (5 pages).

*Primary Examiner* — Yi-Kai Wang
(74) *Attorney, Agent, or Firm* — Maginot, Moore & Beck LLP

(57) ABSTRACT

A method is for operating a vehicle operating device. The vehicle operating device is for influencing a longitudinal and/or lateral movement of a vehicle. The vehicle operating device includes at least one operating unit, which can be manually actuated for controlling multiple vehicle functions. In at least one actuation state, in which one of the vehicle functions is actively controlled by the operating unit, at least one control variable of a non-actively controlled vehicle function is modified, such that an unintentional actuation and/or activation of the non-actively controlled vehicle function is impeded and/or prevented.

13 Claims, 2 Drawing Sheets

(58) Field of Classification Search
CPC . B60W 2050/0037; B60W 2050/0049; B60W
2050/0054; B60W 2540/215; B60W
50/12; B60K 2026/029; B60K 2360/126;
B60K 2360/128; B60K 2360/133; B60K
35/10; B60K 35/29; B60K 2360/131;
B60K 2360/135; B60K 2360/139; B60K
2360/197; B60K 2360/199
USPC .......................................................... 701/41
See application file for complete search history.

(56)                    References Cited

FOREIGN PATENT DOCUMENTS

| | | |
|---|---|---|
| DE | 10 2012 002 304 A1 | 8/2013 |
| DE | 11 2017 001 334 T5 | 11/2018 |
| DE | 10 2017 209 745 A1 | 12/2018 |
| DE | 10 2019 133 372 A1 | 6/2021 |
| DE | 10 2020 211 792 A1 | 3/2022 |
| EP | 2 902 864 A1 | 8/2015 |

* cited by examiner

METHOD FOR OPERATING A VEHICLE OPERATING DEVICE, AND VEHICLE OPERATING DEVICE

This application is a 35 U.S.C. § 371 National Stage Application of PCT/EP2022/065171, filed on Jun. 3, 2022, which claims the benefit of priority to Serial No. DE 10 2021 205 924.4, filed on Jun. 11, 2021 in Germany, the disclosures of which are incorporated herein by reference in their entirety.

The disclosure proceeds from a method of operating a vehicle operating device, as disclosed herein, and from a vehicle operating device, as disclosed herein.

In addition, the disclosure relates to a control unit with a computing unit for carrying out such a method and to a vehicle with such a vehicle operating device.

BACKGROUND

Motor vehicles with a vehicle operating device for influencing a longitudinal and/or lateral movement of the motor vehicle are known from the prior art. As the level of automation increases, so does the desire for new interior and vehicle concepts. In this context, it is conceivable to control several primary vehicle functions with a single operating unit that can be actuated manually, which on the one hand makes it possible to dispense with part of a vehicle sensor system and on the other hand allows novel operating methods to be implemented. In this context, the operating unit can be designed, for example, as a joystick, as a single integrated operating unit for lateral and longitudinal vehicle guidance, and/or as an operating unit with several pushbutton-shaped operating elements. In this context, reference should be made, for example, to DE 10 2011 051 488 A1 and/or DE 10 2017 209 745 A1.

However, integrating several vehicle functions into a single operating unit can lead to undesired interactions between the individual vehicle functions, as they are designed in such a way that one hundred percent decoupling cannot be guaranteed. For example, it can happen that when the default setting for accelerating is actively changed, the default setting for steering is unintentionally changed at the same time.

SUMMARY

The object of the disclosure is, in particular, to provide a method for operating a vehicle operating device and a vehicle operating device with improved properties with respect to operability.

The disclosure relates to a method for operating a vehicle operating device, in particular for influencing a longitudinal and/or lateral movement of a vehicle. The vehicle operating device comprises at least one operating unit which can be manually actuated in particular by the driver for controlling, in particular simultaneously and/or alternately, a plurality of vehicle functions.

It is proposed that in at least one actuation state in which one of the vehicle functions, in particular a first vehicle function, is actively controlled by means of the operating unit, at least one control variable of a non-actively controlled vehicle function, in particular at least one second vehicle function different from the first vehicle function, is modified in such a way that an unintentional actuation and/or activation of the non-actively controlled vehicle function, in particular caused and/or brought about by the active control of the first vehicle function, is made more difficult and/or prevented. In particular, the vehicle functions are coupled and/or connected to one another in such a way that, in the event of active control of one of the vehicle functions, unintentional actuation and/or activation of a vehicle function that is not actively controlled also occurs or can occur, in particular as a result of the active control of the vehicle function. In the present case, the control variable of the second vehicle function or of the non-actively controlled vehicle function is modified in particular in such a way that a required control input for actuation and/or activation the second vehicle function is increased. In addition, the control variable of the second vehicle function or of the non-actively controlled vehicle function is modified in particular in such a way that active control of the second vehicle function and/or deliberate actuation and/or activation of the second vehicle function is still possible. Furthermore, the operating unit can be used in particular to actively control several vehicle functions, in particular simultaneously, and/or to modify several control variables of several vehicle functions that are not actively controlled in such a way that unintentional actuation and/or activation of the vehicle functions that are not actively controlled is made more difficult and/or prevented. This embodiment can improve the operability of the vehicle operating device. In particular, operational safety can be increased in this context, since unintentional and/or unintended actuation and/or activation of a vehicle function not actively controlled by the driver can be made more difficult and/or prevented. In addition, a particularly high degree of flexibility and/or variability can be achieved, whereby novel interior and/or vehicle concepts can advantageously be implemented.

In this context, a "vehicle operating device" is intended to mean at least one part, in particular a subassembly, of a vehicle and preferably of a motor vehicle. In particular, the vehicle operating device is part of a control system of the vehicle and is provided for influencing and/or controlling a longitudinal and/or lateral movement of the vehicle. In addition, the vehicle operating device can be provided for influencing and/or controlling further vehicle functions, such as a gear change function and/or cruise control function. For this purpose, the vehicle operating device comprises the operating unit, which is provided for controlling a plurality of vehicle functions, in particular at least two, at least three or at least four vehicle functions, which are preferably coupled and/or connected to one another, and for this purpose can comprise at least one operating element, for example in the form of a joystick and/or an operating lever, and advantageously a plurality of operating elements, for example in the form of a joystick, an operating lever, a switch and/or a pushbutton. The operating unit is advantageously designed as a by-wire operating unit and is intended to provide a corresponding electrical actuation signal when actuated, in particular for actuating a corresponding actuator of the vehicle, for example a drive system, a brake system and/or a steering system. Preferably, the operating unit is designed for single-handed operation. Furthermore, the vehicle functions are preferably primary vehicle functions, in particular a steering function, a braking function, an acceleration function, and/or a gear change function. Each vehicle function can be assigned to at least one operating element of the operating unit and/or one direction of movement of the operating unit. The term "actively controlling a vehicle function by means of the operating unit" is to be understood in particular to mean that the corresponding vehicle function is controlled, actuated and/or activated in a targeted and/or deliberate manner by deliberate and/or intended actuation and/or movement of the operating unit and/or at least one operating element of the operating unit, in particular by a driver. In particular, a level of a control input, in particular applied by the driver, for actuating and/or activating the vehicle function is above a default limit value in this case. A "non-actively controlled vehicle function" is to be understood in particular as a vehicle function which is not or is not intended to be controlled, actuated and/or activated by a driver in a certain actuation state and/or at a certain time in a targeted and/or conscious manner. In particular, a level of a control input, in particular applied by the driver, for actuating and/or activating the vehicle function is below a default limit value in this case. The non-actively controlled vehicle function can be coupled and/or connected to an actively controlled vehicle function in such a way that, in the event of active control of the corresponding vehicle function, the non-actively controlled vehicle function is or can be unintendedly actuated and/or activated, in particular by actuation and/or movement of the control unit and/or at least one operating element of the operating unit. Furthermore, a "control variable" is to be understood in particular as a variable which is correlated with a control of the corresponding vehicle function and which is designed to be adaptable in such a way that a required control input for actuating and/or activating the vehicle function can be increased in order to make it more difficult and/or prevent unintentional actuation and/or activation of the vehicle function, at least temporarily. The term "provided" is in particular intended to mean specifically programmed, configured, and/or equipped. The phrase "an object being provided for a specific function" is in particular intended to mean that the object fulfills and/or performs this specific function in at least one application and/or operating state.

It is further proposed that, in order to determine the actively controlled vehicle function in the actuation state, at least one degree of actuation of the actively controlled vehicle function is determined and evaluated. In this context, a "degree of actuation" is to be understood in particular as a correlated, advantageously discrete, variable with a deflection and/or an actuation force of the operating unit and/or at least one operating element of the operating unit, which serves as a measure for an actuation of the corresponding vehicle function. In particular, the degree of actuation comprises more than two states (on/off state) and advantageously a plurality of different states. Alternatively or additionally, however, an actuation torque, an actuation force, an actuation time, a driving condition of the vehicle, for example in the form of highway driving and/or parking, and/or an environmental condition of the vehicle, for example determined from a signal from an ambient sensor system of the vehicle, can be determined and evaluated to determine the actively controlled vehicle function. This makes it particularly easy to determine the actively controlled vehicle function.

Furthermore, it is proposed that the modification of the control variable, in particular of the non-actively controlled vehicle function, takes place as a function of a degree of actuation of the actively controlled vehicle function, as a function of a driving state of the vehicle, for example in the form of highway driving and/or parking, and/or as a function of at least one environmental condition of the vehicle, for example determined from a signal from an ambient sensor system of the vehicle. In addition, the modification of the control variable in this case could also take place as a function of an actuation variable of the actively controlled vehicle function, for example an actuation torque, an actuation force and/or an actuation time, which is advantageously derived from the degree of actuation of the actively controlled vehicle function. This allows the control variable of the non-actively controlled vehicle function to be advantageously modified simply as a function of the actively controlled vehicle function.

According to a particularly preferred embodiment, it is proposed that at least one, in particular symmetrical or asymmetrical, deadband is used to modify the control variable, which is applied to the control variable. Advantageously, a width of the deadband is thereby varied as a function of a degree of actuation of the actively controlled vehicle function, as a function of a driving state of the vehicle, for example in the form of a highway trip and/or a parking procedure, and/or as a function of at least one environmental condition of the vehicle, for example determined from a signal of an ambient sensor system of the vehicle. In this case, the deadband is thus selected and/or modified depending on the degree of actuation of the actively controlled vehicle function, the driving state of the vehicle, and/or the environmental condition of the vehicle, and is applied to the non-actively controlled vehicle function, in particular the corresponding control variable. This makes it advantageously easy to adjust a triggering threshold for the non-actively controlled vehicle function.

Alternatively or additionally, at least one offset is used to modify the control variable, which is applied to the control variable. Advantageously, a height and/or a direction or a sign of the offset is thereby varied as a function of a degree of actuation of the actively controlled vehicle function, as a function of a driving state of the vehicle, for example in the form of a highway trip and/or a parking procedure, and/or as a function of at least one environmental condition of the vehicle, for example determined from a signal of an ambient sensor system of the vehicle. In this case, the offset is thus selected and/or modified depending on the degree of actuation of the actively controlled vehicle function, the driving state of the vehicle, and/or the environmental condition of the vehicle, and is applied to the non-actively controlled vehicle function, in particular the corresponding control variable. This embodiment may provide an alternative adaptation of the control variable and/or a trigger threshold for the non-actively controlled vehicle function.

Furthermore, it is suggested alternatively or additionally that at least one modification factor is used to modify the control variable, which is applied to the control variable. Advantageously, a value of the modification factor is thereby varied as a function of a degree of actuation of the actively controlled vehicle function, as a function of a driving state of the vehicle, for example in the form of a highway trip and/or a parking procedure, and/or as a function of at least one environmental condition of the vehicle, for example determined from a signal of an ambient sensor system of the vehicle. In this case, the modification factor is thus selected and/or modified depending on the degree of actuation of the actively controlled vehicle function, the driving state of the vehicle, and/or the environmental condition of the vehicle, and is applied to the non-actively controlled vehicle function, in particular to the corresponding control variable. In this way, a particularly flexible and/or uniform adaptation of the control variable can be achieved.

It is further proposed, alternatively or additionally, that at least one compensation torque and/or one compensation force is used to modify the control variable, which is applied to the control variable by means of an actuator, preferably in the form of an electric motor. In particular, the vehicle operating device may comprise the actuator. The actuator can be, for example, a feedback actuator, which is provided at least to provide a restoring torque to the operating unit, or a separate compensation actuator. Advantageously, a magnitude and/or a direction or a sign of the compensation torque and/or the compensation force is thereby varied as a function of a degree of actuation of the actively controlled vehicle function, as a function of a driving state of the vehicle, for example in the form of a highway trip and/or a parking procedure, and/or as a function of at least one environmental condition of the vehicle, for example determined from a signal of an ambient sensor system of the vehicle. In this case, the compensation torque and/or the compensation force is thus selected and/or modified depending on the degree of actuation of the actively controlled vehicle function, the driving state of the vehicle and/or the environmental condition of the vehicle and is applied to the non-actively controlled vehicle function, in particular the corresponding control variable. In this way, particularly precise adaptation of the control variable can be achieved by flexible actuation of the actuator.

Preferably, it is further proposed that at least one, preferably pre-applied, model of the operating unit, preferably in the form of a model-based software algorithm, is used to modify the control variable, which model at least partially reproduces and/or replicates the physical properties of the operating unit. The model can be determined in particular by means of test measurements and/or by means of special algorithms and stored in particular in an operating memory of the vehicle. In addition, the model could in particular correspond to a physical model of the operating unit that replicates the real operating unit as closely as possible. Advantageously, however, the model corresponds to a simplified and especially preferably a linearized model of the operating unit. In particular, this can reduce computing effort and at the same time achieve a particularly high level of energy efficiency.

An operational safety can be advantageously increased in particular if the vehicle functions comprise primary vehicle functions, in particular a steering function, a braking function, an acceleration function and/or a gear change function. In principle, however, at least one of the vehicle functions could also correspond to a multimedia function, a ventilation function and/or a lighting function.

According to one embodiment, it is proposed that the operating unit for controlling at least one first vehicle function of the vehicle functions is mounted movably and for controlling at least one second vehicle function of the vehicle functions features at least one pushbutton-shaped operating element which can in particular be actuated manually, for example a pushbutton and/or a switch, it being possible to control the first vehicle function of the vehicle functions by means of a movement, in particular a manual movement, of the operating unit, in particular a rotational, pivoting and/or tilting movement, and to control the second vehicle function by means of an actuation, in particular a manual actuation, of the operating element, in particular in the form of a push actuation, and wherein the operating unit and the operating element are decoupled from one another by means of the modification of the control variable in such a way that, when the first vehicle function is actively controlled by an intended movement of the operating unit, an unintended actuation and/or activation of the second vehicle function, in particular by an unintentional actuation of the operating element, is made more difficult and/or is prevented and/or, when the second vehicle function is actively controlled by an intended actuation of the operating element, an unintended actuation and/or activation of the first vehicle function, in particular by an unintentional movement of the operating unit, is made more difficult and/or is prevented. Preferably, the operating unit is thereby mounted movably about a horizontally aligned axis, in particular with respect to the vehicle and/or a driver, for controlling the first vehicle function. In this case, the operating unit particularly preferably comprises a movably mounted base body for controlling the first vehicle function, on which the operating element for controlling the second vehicle function is arranged. Advantageously, a plurality of operating elements for controlling a plurality of second vehicle functions can also be arranged on the base body, the operating elements preferably being arranged in such a way that a driver can actuate them with different fingers of the same hand. This can improve operability and advantageously increase operational safety, especially in the case of a movably mounted operating unit with one or more additional operating elements.

According to a further embodiment, it is proposed that the operating unit for controlling the vehicle functions comprises a plurality of pushbutton-shaped operating elements which can in particular be actuated manually, for example a plurality of pushbuttons and/or a plurality of switches, wherein at least one first vehicle function of the vehicle functions can be controlled by means of an, in particular manually performed, actuation of the first operating element, in particular in the form of a push actuation, and at least one second vehicle function of the vehicle functions can be controlled by means of an, in particular manually performed, actuation of the second operating element, in particular in the form of a push actuation, and wherein the operating elements are decoupled from one another by means of the modification of the control variable in such a way that, when the first vehicle function is actively controlled by an intended actuation of the first operating element, an unintended actuation and/or activation of the second vehicle function, in particular by an unintentional actuation of the second operating element, is made more difficult and/or is prevented and/or, when the second vehicle function is actively controlled by an intended actuation of the second operating element, an unintended actuation and/or activation of the first vehicle function, in particular by an unintentional actuation of the first operating element, is made more difficult and/or is prevented. Preferably, the operating elements are arranged in such a way that a driver can actuate them with different fingers of the same hand. This can improve operability and advantageously increase operational safety, particularly in the case of an operating unit with several operating elements that can be actuated by different fingers, for example.

According to a further embodiment, it is proposed that the operating unit for controlling the vehicle functions comprises a movably mounted operating element that in particular can be actuated manually, in particular a slider or advantageously a joystick and/or an operating lever, wherein at least a first vehicle function of the vehicle functions is controlled by means of a movement, in particular a rotational, pivoting and/or tilting movement, of the operating element in a first direction of movement, in particular performed manually, and/or tilting movement of the operating element in a first direction of movement, and at least one second vehicle function of the vehicle functions being controllable by means of a movement, in particular a manually executed movement, in particular a rotational, pivoting and/or tilting movement, of the operating element in a second direction of movement which, in particular, deviates from the first direction of movement and is advantageously aligned perpendicularly to the first direction of movement, and wherein the directions of movement, in particular the first direction of movement and the second direction of movement, are decoupled from one another by means of the modification of the control variable in such a way that, when the first vehicle function is actively controlled by an intended movement of the operating element in the first direction of movement, an unintended actuation and/or activation of the second vehicle function is prevented, in particular by an unintentional movement of the operating element in the second direction of movement, is made more difficult and/or prevented and/or, when the second vehicle function is actively controlled, an unintended actuation and/or activation of the first vehicle function, in particular by an unintentional movement of the operating element in the first direction of movement, is made more difficult and/or prevented by an intentional movement of the operating element in the second direction of movement. Preferably, the operating element is thereby mounted so as to be movable about a horizontally and/or vertically aligned axis, in particular with respect to the vehicle and/or a driver, for controlling the vehicle functions. This can improve operability and advantageously increase operational safety, particularly in the case of an operating unit with a single operating element that can be moved in several directions.

According to a further aspect of the disclosure, which can be realized in particular on its own or advantageously in addition to the aforementioned aspects of the disclosure, and can preferably be combined with at least some, advantageously at least a major part and preferably all of the aforementioned aspects, a method for operating a vehicle operating device, in particular the aforementioned vehicle operating device, is proposed, wherein the vehicle operating device comprises at least one operating unit that can be actuated manually, for controlling a plurality of vehicle functions, and wherein in at least one further actuating state, in which a plurality of the vehicle functions are actively controlled, in particular simultaneously, by means of the operating unit, for example a steering function and an acceleration function, a reciprocal influence of the actively controlled vehicle functions on one another is modified, in particular by reciprocal adaptation of a respective control variable. In this case, the control variables can be adapted in the same way as in the procedure described above. Preferably, the modification of the reciprocal influence takes place as a function of a degree of actuation of the respective actively controlled vehicle function. In particular, a first control variable of a first actively controlled vehicle function is modified as a function of a degree of actuation of a second actively controlled vehicle function, as a function of a driving state of the vehicle and/or as a function of at least one environmental condition of the vehicle, and a second control variable of the second actively controlled vehicle function is modified as a function of a degree of actuation of the first actively controlled vehicle function, as a function of a driving state of the vehicle and/or as a function of at least one environmental condition of the vehicle. Particularly advantageously, at least one deadband, advantageously with variable width, an offset, advantageously with variable height and/or direction, a modification factor, advantageously with a variable value, and/or a compensation torque and/or a compensation force, advantageously with variable height and/or direction, can be used for modifying the first control variable and/or the second control variable. In addition, at least one model of the operating unit, in particular the model mentioned above, can preferably be used to modify the first control variable and/or the second control variable. This can advantageously reduce and/or prevent mutual interference of actively controlled vehicle functions.

Furthermore, a control unit is proposed with a computing unit which is provided to perform the method for operating the vehicle operating device. A "computing unit" is in particular intended to be understood to mean an electrical and/or electronic unit which features an information input, an information processing and an information output. The computing unit advantageously further features at least one processor, at least one operating memory, at least one input and/or output means, at least one operating program, at least one control routine, at least one calculation routine, at least one evaluation routine and/or at least one adaptation routine. The computing unit is thus provided in particular for modifying the control variable of the non-actively controlled vehicle function in the actuation state in such a way that unintentional actuation and/or activation of the non-actively controlled vehicle function is made more difficult and/or prevented. In addition, the computing unit may be provided for determining the actively controlled vehicle function. In this way, the advantages already mentioned can be achieved in particular, while at least one operability of the vehicle operating device can be improved.

In addition, a vehicle operating device, in particular for influencing a longitudinal and/or lateral movement of a vehicle, is proposed, having at least one operating unit which can be manually actuated, in particular by a driver, for the, in particular simultaneous and/or reciprocal, control of a plurality of vehicle functions, and having an adaptation unit, which is provided for modifying at least one control variable of a non-actively controlled vehicle function in at least one actuation state in which one of the vehicle functions is actively controlled by means of the operating unit, in such a way that unintentional actuation and/or activation of the non-actively controlled vehicle function is made more difficult and/or prevented. The adaptation unit could be mechanical for this purpose and comprise at least one gear element and/or at least one elastic spring element, for example in the form of a compression spring. Preferably, however, the adaptation unit is at least partially electrical and/or electronic and comprises at least one computing unit, which is provided to perform the method for operating the vehicle operating device. The computing unit is thus provided in particular for modifying the control variable of the non-actively controlled vehicle function in the actuation state in such a way that unintentional actuation and/or activation of the non-actively controlled vehicle function is made more difficult and/or prevented. In addition, the computing unit may be provided for determining the actively controlled vehicle function. Preferably, the adaptation unit is integrated into a control unit of the vehicle or the vehicle operating device or is designed as a control unit of the vehicle or the vehicle operating device. In this way, the advantages already mentioned can be achieved in particular, while at least one operability of the vehicle operating device can be improved.

The method for operating the vehicle operating device and the vehicle operating device are not intended here to be limited to the application and embodiment described above. In particular, the method of operating the vehicle operating device and the vehicle operating device may feature a number of individual elements, components, and units different from a number specified herein to perform a function described herein.

BRIEF DESCRIPTION OF THE DRAWINGS

Further advantages result from the following description of the drawings. The drawing shows two exemplary embodiments.

Shown are.

DETAILED DESCRIPTION

Figure 1:
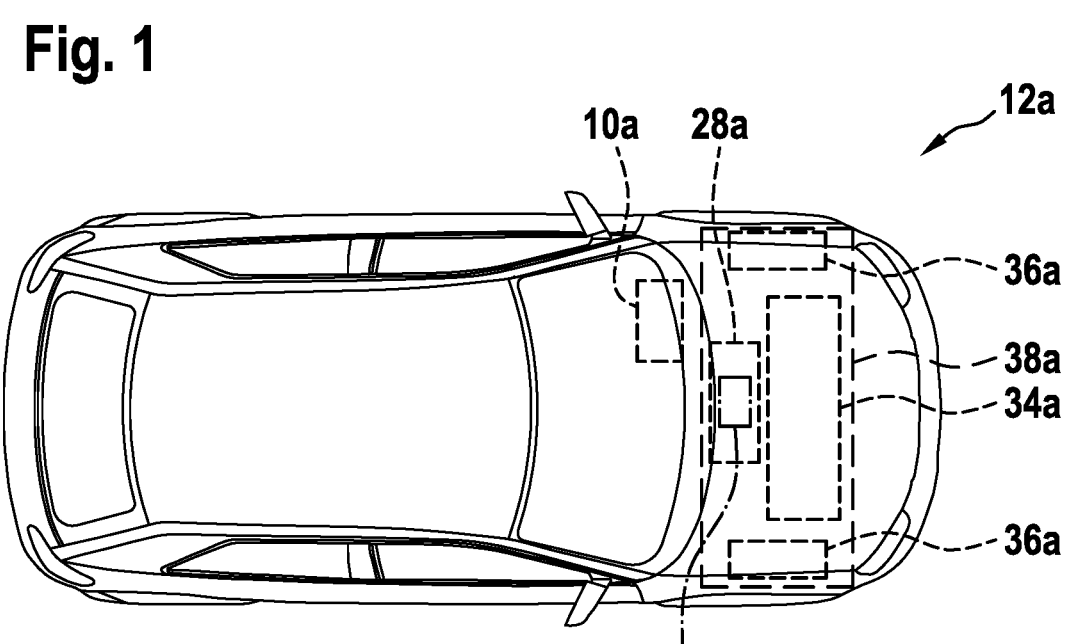
FIG. 1 a vehicle with an exemplary vehicle operating device in a simplified illustration, FIG. 2 a vehicle operating device in a detailed view, FIG. 3 an exemplary flow chart with main method steps of a method for operating the vehicle operating device and FIG. 4 an additional exemplary embodiment of a further vehicle operating device in a detailed view.

FIG. 1 shows an example of a vehicle 12*a* designed as a passenger vehicle in a simplified representation.

The vehicle 12*a* features a per se known drive system 34*a*. The drive system 34*a* comprises a vehicle drive, for example in the form of a drive motor (not shown), and a vehicle transmission with a plurality of shift stages (not shown), which cooperates with the drive motor and is in the form of an automatic transmission by way of example. The drive system 34*a* is configured to provide a drive functionality for moving the vehicle 12*a* in a longitudinal direction. In principle, however, a drive system could also be free of a vehicle transmission.

The vehicle 12*a* also features a per se known brake system 36*a*. The braking system 36*a* comprises a braking unit (not shown) designed in particular as a service brake. The brake system 36*a* is designed to provide a braking functionality for decelerating the vehicle 12*a* in longitudinal direction.

In addition, the vehicle 12*a* comprises a steering system 38*a* known per se. The steering system 38*a* is designed to provide a steering functionality for steering or moving the vehicle 12*a* in a lateral direction. In the present case, the steering system 38*a* is moreover configured as a steer-by-wire steering system, so that a steering input is transmitted exclusively electrically to the vehicle wheels in at least one operating state. In principle, however, a steering system could also be configured as a conventional steering system with a mechanical feedthrough and electrical steering assistance in the form of a servo steering system.

In addition, the vehicle 12*a* comprises a vehicle operating device 10*a*. The vehicle operating device 10*a* features an electrical connection to the drive system 34*a* and is provided for actuating the drive system 34*a*. The vehicle control device 10*a* also features an electrical connection to the braking system 36*a* and is provided for actuating the braking system 36*a*. Further, the vehicle operating device 10*a* features an electrical connection to the steering system 38*a* and is provided for actuating the steering system 38*a*. The vehicle operating device 10*a* is designed in the present case as a by-wire operating device and is provided for controlling a longitudinal and lateral movement of the vehicle 12*a* as well as a gear change function. Alternatively, however, a vehicle operating device could also be provided exclusively for controlling a longitudinal movement or a lateral movement of a vehicle. In addition, it is conceivable to dispense with the control of a gear shift function or to control other vehicle functions, for example a cruise control function, by means of a vehicle operating device.

The vehicle 12*a* also features a control unit 28*a*. The control unit 28*a* is designed as a central vehicle control unit. The control unit 28*a* features an electrical connection to the vehicle operating device 10*a*. The control unit 28*a* further features an electrical connection to the propulsion system 34*a* and the braking system 36*a*, and couples the vehicle operating device 10*a* to the propulsion system 34*a* and the braking system 36*a*. In addition, the control unit 28*a* features an electrical connection to the steering system 38*a* and couples the vehicle operating device 10*a* to the steering system 38*a*. The control unit 28*a* is provided to control the propulsion system 34*a*, the braking system 36*a*, and the steering system 38*a* in response to at least one signal from the vehicle operating device 10*a*.

The control unit 28*a* comprises a computing unit 30*a* for this purpose. The computing unit 30*a* comprises at least one processor (not depicted), for example in the form of a microprocessor, and at least one operating memory (not depicted). The computing unit 30*a* also comprises at least one operating program which is stored in the operating memory and includes at least one control routine, at least one calculation routine, at least one evaluation routine and at least one adaptation routine. Alternatively, however, a control unit could also be different from a central vehicle control unit. In this case, the control unit could, for example, be part of a drive system, part of a brake system, part of a steering system, or part of a vehicle operating device.

Figure 2:
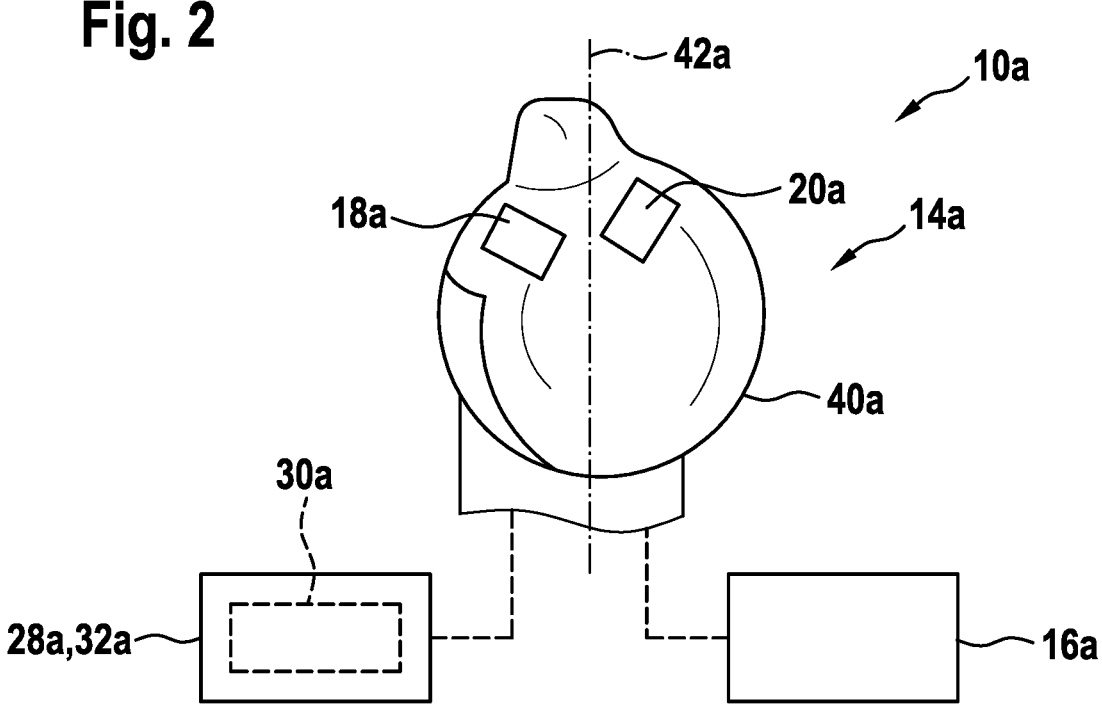

FIG. 2 shows a purely exemplary embodiment of the vehicle operating device 10*a* in a detailed representation. In the present case, the vehicle operating device 10*a* features a single, operating unit 14*a* that can be actuated manually, which is provided for lateral and longitudinal vehicle guidance and for controlling a gear change. The operating unit 14*a* is arranged in a passenger compartment of the vehicle 12*a* and is fixedly connected to the vehicle 12*a*. The operating unit 14*a* is designed as a by-wire operating unit. In addition, the operating unit 14*a* is designed in the present case as an integrated operating part and corresponds in particular to an operating unit disclosed in DE 10 2017 209 745 A1. Alternatively, however, a vehicle operating device could also be different from an integrated operating part and comprise, for example, several, separate operating units, with a first operating unit being provided for transverse vehicle guidance and a second operating unit being provided for longitudinal vehicle guidance.

The operating unit 14*a* comprises a base body 40*a*, in particular at least substantially spherical, and a plurality of separately formed operating elements 18*a*, 20*a*, in particular arranged on a surface of the base body 40*a* that can be actuated by a driver. The base body 40*a* is movably mounted and can be rotated and/or pivoted about a horizontally aligned axis 42*a*, particularly with respect to the vehicle 12*a* and/or a driver. In FIG. 2, the axis 42*a* is oriented vertically for purely illustrative reasons. A first vehicle function in the form of a steering function can be controlled by moving the operating unit 14*a* and in particular the base body 40*a* about the axis 42*a*. The operating elements 18*a*, 20*a* are pushbutton-shaped and, in the present example, are designed as buttons and/or pushbuttons. The operating elements 18*a*, 20*a* are arranged in such a way that a driver can actuate them with different fingers of the same hand. A first operating element 18*a* of the operating elements 18*a*, 20*a* is associated with the drive system 34*a*. By means of an actuation of the first operating element 18*a*, in particular a pressure actuation, a second vehicle function in the form of an acceleration function can be controlled. A second operating element 20*a* of the operating elements 18*a*, 20*a* is associated with the braking system 36*a*. A third vehicle function in the form of a brake function can be controlled by actuating the second operating element 20*a*, in particular by pressing it. Alternatively or additionally, a vehicle operating device could also comprise an operating element designed as a joystick and/or operating lever. Furthermore, an operating unit could comprise exactly one operating element, which could be provided for controlling a drive function and a brake function, for example as a function of an applied pressure. In addition, an operating unit could comprise more than two operating elements, with a third operating element being provided, for example, to control a gear shift function or a multimedia function.

Furthermore, in the present case, the vehicle operating device 10a comprises an actuator 16a. The actuator 16a is mechanically coupled to the operating unit 14a. The actuator 16a is exemplarily designed as a feedback actuator and is provided to detect signals, forces and/or torques from the operating unit 14a, in particular directly, and/or to transmit them to the operating unit 14a, in particular directly. In the present case, the actuator 16a is provided at least for generating a restoring torque to the operating unit 14a. For this purpose, the actuator 16a comprises at least one electric motor (not shown). Alternatively, however, an actuator could be different from a feedback actuator. An actuator could in principle also be omitted.

Integrating several vehicle functions into a single operating unit can lead to undesired interactions between the individual vehicle functions, as they are designed in such a way that one hundred percent decoupling cannot be guaranteed. For example, when the control input for the drive system 34a is actively changed, a control input for the steering system 38a may be simultaneously and unintendedly changed.

Therefore, in order to increase an operability and an operational safety, an exemplary method for operating the vehicle operating device 10a is described below. For this purpose, the vehicle operating device 10a comprises an adaptation unit 32a. The adaptation unit 32a is electrically and/or electronically designed and corresponds to the control unit 28a. The adaptation unit 32a is provided to provide a software-based algorithm for performing the method. Thus, in the present case, the computing unit 30a is provided for executing the method and, in particular, features a computer program with corresponding program code means for this purpose. Alternatively, however, an adaptation unit could also be designed separately from a control unit and, for example, feature its own computing unit for carrying out the method. Furthermore, it is also conceivable in principle to design an adaptation unit mechanically, for example with an elastic spring element.

In at least one actuation state in which one of the vehicle functions, i.e., in particular the steering function, the acceleration function and/or the braking function, is actively controlled by means of the operating unit 14a, at least one control variable of a non-actively controlled vehicle function is modified in such a way that unintentional actuation and/or activation of the non-actively controlled vehicle function is made more difficult and/or prevented. However, the control variable of the non-actively controlled vehicle function is modified in such a way that active control of this vehicle function and/or deliberate actuation and/or activation of this vehicle function is still possible.

To determine the actively controlled vehicle function, at least one degree of actuation of the actively controlled vehicle function, in particular of the operating unit 14a, of the first operating element 18a and/or of the second operating element 20a, is determined and evaluated. In principle, other actuation variables, such as an actuation torque, an actuation force and/or an actuation time, or other variables, such as a driving condition of the vehicle and/or environmental conditions of the vehicle, could of course also be determined and evaluated to determine an actively controlled vehicle function.

Further, the modification of the control variable of the non-actively controlled vehicle function is performed as a function of the degree of actuation of the actively controlled vehicle function, as a function of a driving condition of the vehicle 12a, and/or as a function of at least one environmental condition of the vehicle 12a. Preferably, a model of the operating unit 14a is used which at least partially reproduces and/or replicates the physical properties of the operating unit 14a.

There are several possibilities for modifying the control variable, which can be applied individually or combined with each other.

For example, a deadband, in particular a symmetrical or asymmetrical deadband, can be used to modify the control variable, which is applied to the control variable, with a width of the deadband being varied as a function of the degree of actuation of the actively controlled vehicle function, as a function of the driving state of the vehicle 12a and/or as a function of the environmental condition of the vehicle 12a. This makes it advantageously easy to adjust a triggering threshold for the non-actively controlled vehicle function.

Furthermore, an offset may be used to modify the control variable, which offset is applied to the control variable, wherein a magnitude and/or a direction or a sign of the offset is varied as a function of the degree of actuation of the actively controlled vehicle function, as a function of the driving state of the vehicle 12a, and/or as a function of the environmental condition of the vehicle 12a. This can also be used to advantageously adjust a triggering threshold for the non-actively controlled vehicle function.

Furthermore, a modification factor that is applied to the control variable may be used to modify the control variable, wherein a value of the modification factor is varied depending on the degree of actuation of the actively controlled vehicle function, depending on the driving state of the vehicle 12a, and/or depending on the environmental condition of the vehicle 12a. This makes it possible to achieve a particularly flexible and/or uniform adaptation of the control variable.

Furthermore, a compensation torque and/or a compensation force can also be used to modify the control variable, which compensation torque and/or compensation force is applied to the control variable by means of the actuator 16a, wherein a magnitude and/or a direction or a sign of the compensation torque and/or compensation force is varied as a function of the degree of actuation of the actively controlled vehicle function, as a function of the driving state of the vehicle 12a, and/or as a function of the environmental condition of the vehicle 12a. Hereby, a particularly exact adaptation of the control variable can be achieved by a flexible actuation of the actuator 16a.

According to the present exemplary embodiment, the operating unit 14a and the first operating element 18a are thus decoupled from each other by means of the modification of a first control variable in such a way that, when the first vehicle function, i.e., the steering function, is actively controlled, an unintended actuation and/or activation of the second vehicle function, i.e., the acceleration function, is made more difficult and/or prevented by an intended movement of the operating unit 14a. In addition, the operating unit 14a and the second operating element 20a are decoupled from each other by means of the modification of a second control variable in such a way that, when the first vehicle function, i.e., the steering function, is actively controlled, an unintended actuation and/or activation of the third vehicle function, i.e., the braking function, is made more difficult and/or prevented by an intentional movement of the operating unit 14a.

Furthermore, the operating elements 18*a*, 20*a* can also be decoupled from one another by means of the modification of a third control variable and/or the second control variable in such a way that, when the second vehicle function, i.e., the acceleration function, is actively controlled, an unintended actuation and/or activation of the third vehicle function, i.e., the braking function, is made more difficult and/or prevented by an intentional actuation of the first operating element 18*a*. Similarly, the operating elements 18*a*, 20*a* can be decoupled from one another by means of the modification of a fourth control variable and/or the first control variable in such a way that, when the third vehicle function, i.e., the braking function, is actively controlled, an unintended actuation and/or activation of the second vehicle function, i.e., the acceleration function, is made more difficult and/or prevented by an intentional actuation of the second operating element 20*a*.

Furthermore, it can be provided that in at least one further actuation state in which several of the vehicle functions are actively controlled, in particular simultaneously, by means of the operating unit 14*a*, for example a steering function and an acceleration function, a reciprocal influence of the actively controlled vehicle functions on one another is modified by reciprocal adaptation of a respective control variable. In addition, the individual modifications per control variable can be coordinated in this context, for example by means of a corresponding offsetting rule. In this case, an adaptation of the control variables can be carried out analogously to the previously described method, i.e., by means of a corresponding deadband with variable width, a corresponding offset with variable height and/or direction, a corresponding modification factor with a variable value and/or a corresponding compensation torque or force with variable height and/or direction.

In this context, it must be taken into account in particular that, for example, a ring finger and a middle finger of the same hand cannot usually be moved completely independently of each other and that a rotation of a forearm can in principle also lead to slight movements of the individual fingers. The method and the design of the vehicle operating device 10*a* can thus prevent, for example, that the steering movements cause simultaneous braking when accelerating out of a curve or that simultaneous steering occurs when accelerating. Accordingly, an unintended influence of the steering function by the acceleration and/or braking function and vice versa can be advantageously compensated.

Figure 3:
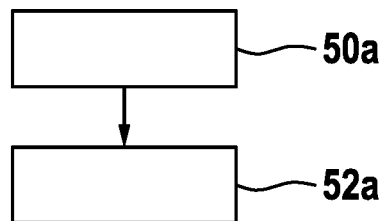

FIG. 3 shows an exemplary flow chart with main method steps of the method for operating the vehicle operating device 10*a*.

In a first method step 50*a*, a vehicle function actively controlled by means of the operating unit 14*a* is determined. For this purpose, for example, the degree of actuation of the actively controlled vehicle function, i.e., in particular of the operating unit 14*a*, the first operating element 18*a* and/or the second operating element 20*a*, can be determined and evaluated. If the level of a control input, in particular applied by the driver, for actuation and/or activation of the vehicle function is above a default limit value, the vehicle function is assumed to be actively actuated.

In a second method step 52*a*, at least one control variable of a vehicle function not actively controlled by means of the operating unit 14*a* and advantageously of all vehicle functions not actively controlled by means of the operating unit 14*a* is modified in such a way that unintentional actuation and/or activation of the vehicle function or vehicle functions not actively controlled is/are made more difficult and/or prevented. For this purpose, a deadband, an offset, a modification factor, a compensation torque and/or a compensation force can be applied to the control variable, for example, taking into account a degree of actuation of the actively controlled vehicle function, a driving state of the vehicle 12*a* and/or at least one environmental condition of the vehicle 12*a*.

The exemplary flowchart in FIG. 3 is only intended to describe a method of operating the vehicle operating device 10*a* by way of example. In particular, individual method steps can also vary, or additional method steps can be added.

Figure 4:
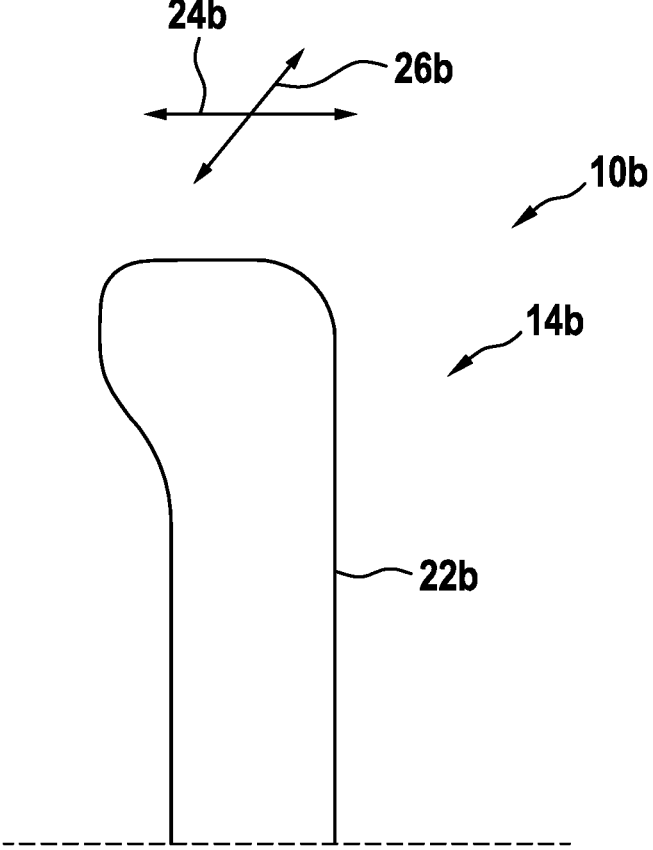

FIG. 4 shows a further exemplary embodiment of the disclosure. The following description and the drawings are substantially limited to the differences between the exemplary embodiments, whereby reference can basically also be made to the drawings and/or the description of the other exemplary embodiments, in particular FIGS. 1 through 3, with respect to identically designated components, in particular with respect to components having the same reference characters. In order to distinguish between the exemplary embodiments, the letter a has been added to the reference characters for the exemplary embodiment in FIGS. 1 through 3. In the exemplary embodiment of FIG. 4, the letter a is replaced by the letter b.

The further exemplary embodiment of FIG. 4 differs from the previous exemplary embodiment at least substantially in a design of an operating unit 14*b* of a vehicle operating device 10*b*.

In this case, the operating unit 14*b* comprises a single operating element 22*b* having an elongated base body. The operating element 22*b* is designed as a joystick and/or control lever. The operating element 22*b* is movably mounted and can be tilted and/or pivoted in a plurality of directions of movement 24*b*, 26*b*. By means of a movement of the operating element 22*b* in a first direction of movement 24*b*, a first vehicle function in the form of a steering function can be controlled. Furthermore, at least a second vehicle function in the form of an acceleration and/or braking function can be controlled by means of a movement of the operating element 22*b* in a second direction of movement 26*b* aligned perpendicular to the first direction of movement 24*b*. In principle, the operating element in this case could also be tiltable and/or swiveling only in one direction of movement or about one axis and comprise additional push-button-shaped operating elements, for example for an acceleration function or braking function.

According to the present exemplary embodiment, the directions of movement 24*b*, 26*b* are decoupled from each other by means of a modification of a control variable in such a way that, when the first vehicle function, i.e., the steering function, is actively controlled by an intended movement of the operating element 22*b* in the first direction of movement 24*b*, an unintended actuation and/or activation of the second vehicle function, i.e., the acceleration and/or braking function, is made more difficult and/or prevented by an unintentional movement of the operating element 22*b* in the second direction of movement 26*b*. In addition, the directions of movement 24*b*, 26*b* are decoupled from one another by means of a modification of a further control variable in such a way that, when the second vehicle function, i.e., the acceleration and/or braking function, is actively controlled by an intended movement of the operating element 22*b* in the second direction of movement 26*b*, an unintended actuation and/or activation of the first vehicle function, i.e., the steering function, by an unintentional movement of the operating element 22*b* in the first direction of movement 24*b* is made more difficult and/or prevented.

Alternatively, a vehicle operating device could also comprise at least one pushbutton-shaped operating element or several pushbutton-shaped operating elements in this case, which could be provided, for example, for controlling a gear shift function or a multimedia function.

The invention claimed is:

1. A method for operating a vehicle operating device for influencing a longitudinal and/or lateral movement of a vehicle, the vehicle operating device comprising at least one operating unit that can be actuated manually for controlling a plurality of vehicle functions of the vehicle, the method comprising:

preventing activation of a non-actively controlled vehicle function of the plurality of vehicle functions when the at least one operating unit is actively being moved to control an actively-controlled vehicle function of the plurality of vehicle functions, such that an unintentional activation of the non-actively controlled vehicle function is prevented, wherein the at least one operating unit is movable in a deadband for which (i) changes to the non-actively controlled vehicle function are prevented, and (ii) changes to the actively-controlled vehicle function are enabled, wherein a width of the deadband is varied as a function of a driving state of the vehicle, and wherein changes to the non-actively controlled vehicle function are enabled when the at least one operating unit moved beyond the width of the deadband.

2. The method according to claim 1, further comprising:

preventing the unintentional activation of the non-actively controlled vehicle function by modifying at least one control variable associated with the non-actively controlled vehicle function;

using at least one offset to modify the at least one control variable;

applying the offset to the at least one control variable; and varying a level and/or a direction of the offset (i) as a function of a degree of actuation of the actively controlled vehicle function, (ii) as the function of the driving state of the vehicle, and/or (iii) as a function of at least one environmental condition of the vehicle.

3. The method according to claim 1, further comprising:

preventing the unintentional activation of the non-actively controlled vehicle function by modifying at least one control variable associated with the non-actively controlled vehicle function;

using at least one modification factor, which is applied to the at least one control variable, to modify the control variable; and varying a value of the at least one modification factor (i) as a function of a degree of actuation of the actively controlled vehicle function, (ii) as the function of the driving state of the vehicle, and/or (iii) as a function of at least one environmental condition of the vehicle.

4. The method according to claim 1, further comprising:

preventing the unintentional activation of the non-actively controlled vehicle function by modifying at least one control variable associated with the non-actively controlled vehicle function;

modifying the at least one control variable based on (i) a torque variable representing at least one compensation torque, and/or (ii) a force variable representing at least one compensation force;

varying the torque variable and/or the force variable (i) as a function of a degree of actuation of the actively controlled vehicle function, (ii) as the function of the driving state of the vehicle, and/or (iii) as a function of at least one environmental condition of the vehicle.

5. The method according to claim 1, further comprising:

preventing the unintentional activation of the non-actively controlled vehicle function by modifying at least one control variable associated with the non-actively controlled vehicle function; and using at least one model of the at least one operating unit to modify the at least one control variable, the at least one model at least partially reproduces and/or replicates physical properties of the at least one operating unit.

6. The method according to claim 1, wherein the plurality of vehicle functions comprise at least one of a steering function, a braking function, an acceleration function, and/or a gear change function.

7. The method according to claim 1, wherein:

the unintentional activation of the non-actively controlled vehicle function is prevented by modifying at least one control variable associated with the non-actively controlled vehicle function, the actively controlled vehicle function is a first vehicle function, the non-actively controlled vehicle function is a second vehicle function, the at least one operating unit for controlling the first vehicle function is movably mounted and includes at least one pushbutton-shaped operating element configured to control the second vehicle function, the first vehicle function is controlled by a movement of the at least one operating unit and the second vehicle function is controlled by an actuation of the at least one operating element, and the at least one operating unit and the at least one operating element are decoupled from one another by modification of the control variable such that, (i) when the first vehicle function is actively controlled by an intended movement of the at least one operating unit, an unintended actuation and/or activation of the second vehicle function is prevented, and/or (ii) when the second vehicle function is actively controlled by an intended actuation of the at least one operating element, an unintended actuation and/or activation of the first vehicle function is prevented.

8. The method according to claim 1, wherein:

the unintentional activation of the non-actively controlled vehicle function is prevented by modifying at least one control variable associated with the non-actively controlled vehicle function, the actively controlled vehicle function is a first vehicle function, the non-actively controlled vehicle function is a second vehicle function, the at least one operating unit for controlling the vehicle functions comprises a plurality of pushbutton-shaped operating elements, the first vehicle function is controlled by an actuation of a first operating element of the plurality of pushbutton-shaped operating elements and the second vehicle function is controlled by an actuation of a second operating element of the plurality of pushbutton-shaped operating elements, and the first and the second operating elements are decoupled from one another by modification of the at least one control variable such that, (i) when the first vehicle function is actively controlled by an intended actuation of the first operating element, an unintended actuation and/or activation of the second vehicle function is prevented, and/or (ii) when the second vehicle function is actively controlled by an intended actuation of the second operating element, an unintended actuation and/or activation of the first vehicle function is prevented.

9. The method according to claim 1, wherein:

the unintentional activation of the non-actively controlled vehicle function is prevented by modifying at least one control variable associated with the non-actively controlled vehicle function, the actively controlled vehicle function is a first vehicle function, the non-actively controlled vehicle function is a second vehicle function, the at least one operating unit for controlling the vehicle functions comprises a movably mounted operating element, the first vehicle function is controlled by a movement of the operating element in a first direction of movement and the second vehicle function is controlled by a movement of the operating element in a second direction of movement, and the first and second directions of movement are decoupled from one another by modification of the at least one control variable such that, (ii) when the first vehicle function is actively controlled by an intended movement of the operating element in the first direction of movement, an unintended actuation and/or activation of the second vehicle function is prevented, and/or (ii) when the second vehicle function is actively controlled by an intended movement of the operating element in the second direction of movement, an unintended actuation and/or activation of the first vehicle function is prevented.

10. The method according to claim 1, wherein a control unit comprising a computing unit is configured to carry out the method.

11. A vehicle operating device for influencing a longitudinal and/or lateral movement of a vehicle, comprising:

at least one operating unit configured to be actuated manually, and configured to control a plurality of vehicle functions of the vehicle; and an adaptation unit configured to prevent activation of a non-actively controlled vehicle function of the plurality of vehicle functions when the at least one operating unit is actively being moved to control an actively-controlled vehicle function of the plurality of vehicle functions, such that an unintentional activation of the non-actively controlled vehicle function is prevented, wherein the at least one operating unit is movable in a deadband for which (i) changes to the non-actively controlled vehicle function are prevented, and (ii) changes to the actively-controlled vehicle function are enabled, wherein a width of the deadband is varied as a function of a driving state of the vehicle, and wherein changes to the non-actively controlled vehicle function are enabled when the at least one operating unit moved beyond the width of the deadband.

12. The vehicle operating device according to claim 11, wherein the adaptation unit comprises a computing unit.

13. The vehicle operating device according to claim 11, wherein the vehicle operating device is included in a motor vehicle.

* * * * *